(12) United States Patent
Brecher et al.

(10) Patent No.: US 11,964,223 B1
(45) Date of Patent: Apr. 23, 2024

(54) METHODS AND APPARATUS FOR AN INERTIAL SEPARATION OF AIR IN AN ELECTRIC AIRCRAFT

(71) Applicant: BETA AIR, LLC, South Burlington, VT (US)

(72) Inventors: Stefan Stuart Brecher, Winooski, VT (US); Manon Danielle Belzile, Fairfield, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,809

(22) Filed: Oct. 15, 2022

(51) Int. Cl.
*B01D 45/00* (2006.01)
*B64C 29/00* (2006.01)

(52) U.S. Cl.
CPC .......... *B01D 45/00* (2013.01); *B64C 29/0008* (2013.01); *B64D 2241/00* (2013.01)

(58) Field of Classification Search
CPC ........ B01D 45/08; B01D 45/04; B01D 45/16; B01D 2279/60; B01D 45/00; F02C 7/052; F02C 7/05; F02C 7/36; F02C 3/107; F02C 7/055; B64C 29/0008; B64D 2241/00
See application file for complete search history.

(56) References Cited

U.S. PATENT DOCUMENTS

| | | | |
|---|---|---|---|
| 3,338,049 A * | 8/1967 | Fernberger | F02C 7/05 55/306 |
| 3,465,950 A * | 9/1969 | Duffy | F02C 7/05 55/306 |
| 4,312,645 A | 1/1982 | Mavros | |
| 4,397,431 A * | 8/1983 | Ben-Porat | B64D 33/02 60/39.092 |
| 4,702,071 A * | 10/1987 | Jenkins | F02C 7/052 55/306 |
| 4,840,645 A * | 6/1989 | Woodworth | B01D 21/262 55/401 |
| 4,928,480 A * | 5/1990 | Oliver | F02C 7/052 55/306 |
| 5,039,317 A * | 8/1991 | Thompson | F02C 7/052 55/306 |
| 6,702,873 B2 * | 3/2004 | Hartman | F02M 35/022 96/417 |
| 7,296,395 B1 * | 11/2007 | Hartman | B01D 45/04 55/306 |
| 7,854,778 B2 * | 12/2010 | Groom | B64D 33/02 55/306 |
| 7,927,408 B2 * | 4/2011 | Sheoran | B01D 45/04 55/306 |
| 9,046,056 B2 * | 6/2015 | Lerg | F02C 7/055 |

(Continued)

FOREIGN PATENT DOCUMENTS

| | | |
|---|---|---|
| DE | 1272633 B | 7/1968 |
| DE | 102011107730 A1 | 1/2013 |

*Primary Examiner* — Dung H Bui
(74) *Attorney, Agent, or Firm* — Brake Hughes Bellermann LLP

(57) ABSTRACT

An apparatus for an inertial separation of air in an electric aircraft, wherein the apparatus includes an intake duct configured to intake an airflow, an inertial air separator configured to separate the airflow into a clean airflow and a dirty airflow, a propulsor configured to intake the clean airflow, wherein the propulsor includes a stator and a rotor, and a heat exchanger configured to intake the dirty airflow.

20 Claims, 5 Drawing Sheets

(56) References Cited

U.S. PATENT DOCUMENTS

| | | | | |
|---|---|---|---|---|
| 10,513,979 | B2* | 12/2019 | Renninger | F02C 7/052 |
| 10,731,557 | B1* | 8/2020 | Himmelmann | F02C 3/045 |
| 10,767,559 | B2* | 9/2020 | Smith, III | F02C 7/055 |
| 2010/0162682 | A1* | 7/2010 | Lerg | F02C 7/052 |
| | | | | 60/39.092 |
| 2014/0119891 | A1* | 5/2014 | Schmittenberg | F02C 7/05 |
| | | | | 415/121.2 |
| 2014/0290254 | A1* | 10/2014 | Manning | F01D 25/32 |
| | | | | 60/752 |
| 2015/0040535 | A1* | 2/2015 | Judd | F02C 7/05 |
| | | | | 60/39.092 |
| 2015/0300265 | A1* | 10/2015 | Suciu | F02C 7/052 |
| | | | | 415/1 |
| 2015/0345331 | A1* | 12/2015 | Murray | F01D 25/14 |
| | | | | 60/785 |
| 2015/0354453 | A1* | 12/2015 | Hanrahan | F02C 7/05 |
| | | | | 60/39.092 |
| 2015/0354461 | A1* | 12/2015 | Meier | F02C 7/18 |
| | | | | 60/726 |
| 2016/0053686 | A1* | 2/2016 | Labrecque | F01D 17/105 |
| | | | | 137/15.2 |
| 2016/0245152 | A1* | 8/2016 | Thomassin | F02C 7/14 |
| 2016/0245166 | A1* | 8/2016 | Thomassin | F02B 29/0418 |
| 2016/0245171 | A1* | 8/2016 | Lamarre | F02B 37/004 |
| 2016/0363051 | A1* | 12/2016 | Snyder | B01D 45/16 |
| 2017/0138263 | A1* | 5/2017 | Duge | B64D 33/02 |
| 2017/0191503 | A1* | 7/2017 | Pearson | B01D 45/12 |
| 2017/0211475 | A1* | 7/2017 | Mayer | B01D 45/06 |
| 2017/0298830 | A1* | 10/2017 | Ertas | F01D 25/22 |
| 2017/0363000 | A1* | 12/2017 | Kiszewski | F02C 7/052 |
| 2017/0370287 | A1* | 12/2017 | Pearson | F01D 9/02 |
| 2018/0021711 | A1* | 1/2018 | Mook | B01D 45/08 |
| | | | | 95/269 |
| 2018/0106225 | A1* | 4/2018 | Dionne | F02M 35/024 |
| 2018/0208323 | A1* | 7/2018 | Parsons | B64D 33/02 |
| 2018/0209340 | A1* | 7/2018 | Renninger | B01D 45/04 |
| 2019/0024587 | A1* | 1/2019 | Smith, III | F02C 3/04 |
| 2019/0078514 | A1* | 3/2019 | Eastwood | F01D 11/24 |
| 2019/0263531 | A1* | 8/2019 | Kooiman | B01D 46/0047 |
| 2019/0277198 | A1* | 9/2019 | Smith, III | F02C 7/052 |
| 2020/0300163 | A1* | 9/2020 | Osgood | F01D 25/12 |
| 2020/0332711 | A1* | 10/2020 | Owen | F02C 7/052 |
| 2020/0385130 | A1* | 12/2020 | Verna | H02K 5/1735 |
| 2021/0062719 | A1* | 3/2021 | Erickson | F02C 7/06 |
| 2021/0307474 | A1* | 10/2021 | Conrad | B01D 45/16 |
| 2022/0260014 | A1* | 8/2022 | Sidorovich Paradiso | F01D 25/32 |
| 2022/0332431 | A1* | 10/2022 | Niergarth | B64D 37/34 |
| 2022/0411073 | A1* | 12/2022 | Army | B01D 45/04 |
| 2023/0175442 | A1* | 6/2023 | Cloutier | F02C 9/00 |
| | | | | 701/425 |

* cited by examiner

METHODS AND APPARATUS FOR AN INERTIAL SEPARATION OF AIR IN AN ELECTRIC AIRCRAFT

FIELD OF THE INVENTION

The present invention generally relates to the field of electric aircraft. In particular, the present invention is directed to methods and apparatus for an inertial separation of air in an electric aircraft.

BACKGROUND

In air cooling the propulsor, it may be desirable to filter dirty air from clean air. Existing solutions for use of the filtered dirty air are not satisfactory.

SUMMARY OF THE DISCLOSURE

In an aspect, the present disclosure is directed to an apparatus for an inertial separation of air in an electric aircraft, wherein the apparatus includes an intake duct configured to intake an airflow, an inertial air separator configured to separate the airflow into a clean airflow and a dirty airflow, a propulsor configured to intake the clean airflow, wherein the propulsor includes a stator and a rotor, and a heat exchanger configured to intake the dirty airflow.

In another aspect, the present disclosure is direct to a method for an inertial separation of air in an electric aircraft, wherein the method includes intaking, using an intake duct, an airflow, separating, using an inertial air separator, the airflow into a clean airflow and a dirty airflow, intaking, using a propulsor including a stator and a rotor, the clean airflow, and intaking, using a heat exchanger, the dirty airflow.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At high level, aspects of the present disclosure are directed to an apparatus for an inertial separation of air in an electric aircraft, wherein the apparatus includes an intake duct configured to intake an airflow, an inertial air separator configured to separate the airflow into a clean airflow and a dirty airflow, a propulsor configured to intake the clean airflow, wherein the propulsor includes a stator and a rotor, and a heat exchanger configured to intake the dirty airflow.

At another high level, aspects of the present disclosure are directed to a method for an inertial separation of air in an electric aircraft, wherein the method includes intaking, using an intake duct, an airflow, separating, using an inertial air separator, the airflow into a clean airflow and a dirty airflow, intaking, using a propulsor including a stator and a rotor, the clean airflow, and intaking, using a heat exchanger, the dirty airflow.

Figure 1:
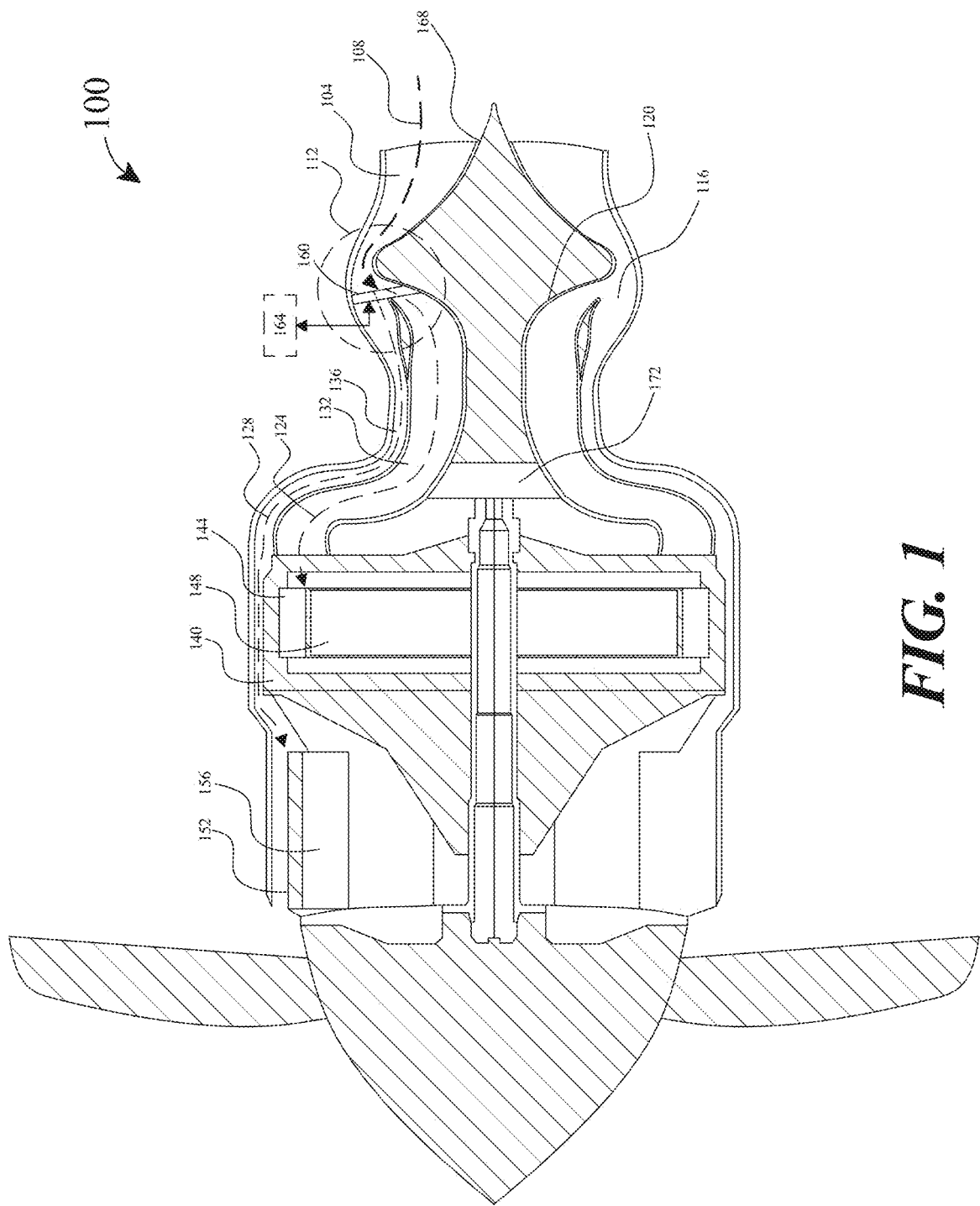
FIG. 1 is a cross-section view of an exemplary embodiment of an apparatus for an inertial separation of air in an electric aircraft.

Referring now to FIG. 1, an exemplary embodiment of an apparatus 100 for an inertial separation of air in an electric aircraft. The apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or computing device.

With continued reference to FIG. 1, apparatus 100 include an intake duct 104 configured to intake an airflow 108. As used in this disclosure, an "intake duct" is a part of electric aircraft that transfer air between one or more spaces of electric aircraft. In some cases, intake duct 104 may be configured to be surround propulsor 140. In some embodiments, without limitation, intake duct may be in a circular shape. In some embodiments, intake duct may be an annular intake duct. In some embodiments, intake duct 104 may include a duct channel 116, wherein the duct channel is a pathway that directs airflow. In some cases, intake duct 104 may include a plurality of duct channels. In a non-limiting example, intake duct 104 may include a primary duct channel 132 and a secondary duct channel 136, wherein the primary duct channel 132 may include a duct channel diameter greater than the duct channel diameter of the secondary duct channel 136. Both primary duct channel 132 and secondary duct channel 136 may direct and/or further transfer airflow 108 from one position to another position within apparatus 100 and/or electric aircraft. In some embodiments, intake duct 104 may include a duct inlet. In some cases, duct inlet may be disposed distal to propulsor 140 and configured to intake airflow 108 into duct channel 116. In other embodiments, intake duct 104 may include a duct outlet. In some cases, duct outlet may be disposed proximal to propulsor 140 and configured to exhaust airflow 108 within duct channel 116. In a non-limiting example, intake duct 104 may intake airflow 108 from outside environment through a duct inlet, wherein the duct inlet may be located at an airfoil away from propulsor 140. Airflow 108 may travel from duct inlet to a duct outlet through duct channel 116 and exist from the duct outlet, wherein duct outlet may be located inside of propulsor 140. Additionally, or alternatively, intake duct 104 may include a NACA duct, wherein the NACA duct is an intake duct allows airflow to enter an internal duct with a minimal disturbance to airflow 108. In some cases, NACA duct may reduce drag force that act on electric aircraft. In some embodiments, without limitation, intake duct 104 may be a submerged duct, wherein the submerged duct may further include a shallow ramp with curved surface that recessed into the airfoil surface of electric aircraft. In other embodiments, without limitation, intake duct 104 may be a bypass duct, wherein the bypass duct may further be configured to reduce power consumption and/or propulsor noise. Propulsor disclosed here will be described in further detail below.

With continued reference to FIG. 1, in some embodiments, airflow 108 may be a boundary layer flow. As used in this disclosure, a "boundary layer flow" is flow within a boundary layer, wherein the boundary layer is a thin layer of fluid in an immediate vicinity of a bounding surface formed by the fluid flowing along the bounding surface. In a non-limiting example, boundary layer flow may be flow within boundary layer which formed by air flowing the surface of electric aircraft. In some cases, boundary layer may include a no-slip boundary condition, wherein under the no-slip boundary condition, boundary layer flow may have zero flow velocity relative to the surface of electric watercraft. In other cases, boundary layer flow may include a flow velocity monotonically increases above the surface of electric watercraft until returns to a bulk flow velocity. Additionally, or alternatively, boundary layer flow may include a laminar boundary layer flow, wherein the laminar boundary layer flow is a very smooth flow. In some cases, laminar boundary layer flow may increase boundary layer as laminar boundary layer flow continues back from a leading edge. Further, boundary layer flow may include a turbulent boundary layer flow, wherein the turbulent boundary layer flow is a turbulent flow formed by decomposition of laminar boundary layer flow. In some cases, turbulent boundary layer flow may create more skin fraction drag then laminar boundary layer flow.

With continued reference to FIG. 1, in some embodiments, airflow 108 may be a constant airflow. As used in this disclosure, a "constant airflow" is airflow 108 with a constant airflow velocity. In some cases, intake duct 104 may be not able to intake an inconstant airflow near the entrance of intake duct 104, wherein the inconstant airflow is airflow 108 with inconstant airflow velocity. In a non-limiting example, constant airflow may be generated around apparatus 100 at 100 to 2550 revolutions per minutes of the fan of propulsor 140.

With continued reference to FIG. 1, apparatus 100 includes an inertial air separator 112 configured to separate airflow 108 into a clean airflow 124 and a dirty airflow 128. As used in this disclosure, an "inertial air separator" is a system that separates physical particles, from airflow 108 using a combination of forces, such as, without limitation, centrifugal force, gravitational force, inertial force, and the like thereof. In some cases, physical particles, may include, without limitation, dust, dirt, sand, soot, rock, and the like thereof. As used in this disclosure, a "clean airflow" is air separated from impurities. As used in this disclosure, a "dirty airflow" is separated air with physical impurities. Impurities may include moisture (e.g., water and/or water vapor), vapors, and/or particles. In some cases, dirty airflow 128 may include, without limitation, car emissions, chemicals from factories, dust, pollen, mold spores, ozone, and the like thereof. In a non-limiting example, inertial air separator 112 may move physical particles to an area where one or more forces exerted by airflow 108 are minimal. Additionally, or alternatively, inertial air separator 112 may separate airflow 108 into a dry airflow and a wet airflow in a similar manner. In some cases, clean air 124 may be dry air and dirty air 128 may be wet air.

With continued reference to FIG. 1, in some embodiments, inertial air separator 112 may include a gradient 120 configured to disengage a plurality of physical particles from airflow 108. As used in this disclosure, a "gradient" is an inclined part of duct channel 116. In some cases, gradient 120 may be a descent part of duct channel 116. In some embodiments, gradient 120 may be a slope, wherein the slope is an increase or decrease in magnitude of duct channel vertical displacement from one location to another location. In some cases, both primary duct channel 132 and secondary duct channel 136 within duct channel 116 may share a single gradient 120. In other cases, primary duct 132 channel and secondary duct channel 136 within duct channel 116 may have different gradient 120. In a non-limiting example, intake duct may include a duct channel 116 with a primary duct channel 132 and a secondary duct channel 136, wherein the primary duct channel 132 may include a first gradient and the secondary duct channel 136 may include a second gradient, and wherein the first gradient may include a greater descent (i.e., greater vertical displacement) than the second gradient; therefore, dirty air 128 within airflow 108 may enter secondary duct channel 136 due to a combination of gravitational force and inertial force and clean air 124 within airflow 108 may enter primary duct channel 132.

With continued reference to FIG. 1. In some embodiments, inertial air separator 112 may include an annular inertial air separator. As used in this disclosure, an "annular inertial air separator" may be an inertial air separator in a ring shape. In some embodiments, inertial air separator 112 may be configured to surround a core 168, wherein the core is a cylindrical structure disposed at center of apparatus 100. In some cases, core 168 may be on a central axis of apparatus 100 and/or electric aircraft. In some embodiments, core 168 may include a plurality of different diameters. In a non-limiting example, core 168 may be disposed in the center of intake duct. Core 168 may include a first portion including a first diameter and a second portion including a second diameter, wherein the first portion may be proximal to the entrance of intake duct 104 and the second portion may be proximal to inertial air separator 112, and wherein the first diameter is smaller than the second diameter. First portion of core 168 may form a first distance with an inner wall of intake duct 104, and second portion of core 168 may form a second distance with the inner wall of intake duct 104, wherein the first distance may be greater than the second distance. Greater first distance may allow intake duct 104 to intake greater amount of airflow 108. Smaller second distance may allow inertial air separator accelerate airflow 108, and further separate clean air 124 with dirty air 128 more preferably. Additionally, or alternatively, core 168 may include a third portion, wherein third portion may be proximal to primary duct channel 132. Third diameter may be smaller than second diameter and/or greater than first diameter. In some cases, core 168 may be attached to propulsor 140. In other cases, core 168 may be further attached to rotor shaft within propulsor 140. In other embodiments, core 168 may be hollow.

With continued reference to FIG. 1, apparatus 100 may include a propulsor 140. As used in this disclosure, a "propulsor" is a component and/or device used to propel a craft by exerting force on a fluid medium, which may include a gaseous medium such as air or a liquid medium such as water. In a non-limiting example, propulsor 140 may be configured to propel electric aircraft in air. Propulsor 140 may include an electric motor. An "electric motor," as used in this disclosure, is a machine that converts electrical energy into mechanical energy. Electric motor may be driven by direct current (DC) or alternating current (AC) electric power and may include, without limitation, brushless DC electric motors, switched reluctance motors, induction motors, or any combination thereof. Electric motor may also include electronic speed controllers or other components for regulating motor speed, rotation direction, and/or dynamic braking. Electric motor within propulsor 140 may include a stator 144 and a rotor 148. As used in this disclosure, a "stator", is a stationary component of a motor and/or motor assembly. In an embodiment, stator 144 may have an inner and outer cylindrical surface; a plurality of magnetic poles may extend outward from the outer cylindrical surface of the stator. In an embodiment, stator 144 may include an annular stator, wherein the stator is ring-shaped. In an embodiment, stator 144 may be incorporated into a DC motor where stator 144 is fixed and functions to supply the magnetic fields where a corresponding rotor 148 rotates. In an embodiment, stator 144 may be incorporated an AC motor where the stator 144 is fixed and functions to supply the magnetic fields by radio frequency electric currents through an electromagnet to a corresponding rotor 148 rotates. As used herein, a "rotor" is a portion of electric motor that rotates with respect to a stator of the electric motor. Propulsor may be described in more detail in reference to FIG. 2 below. Additionally, or alternatively, propulsor 140 may include a rotor shaft, wherein the rotor shaft may be attached to rotor 148. Rotor shaft may spin as rotor 148 rotates. Further, a fan containing a plurality of fan blades may be attached to one side of rotor shaft, wherein the fan may be configured to transfer mechanical energy into thrust. In a non-limiting example, propulsor 140 may be a turbine engine. Rotor shaft and fan disclosed here may be described in further detail below in reference to FIGS. 2 and 3.

With continued reference to FIG. 1, propulsor 140 is configured to intake clean airflow 124. In some embodiments, clean airflow 124 may be used to cool components within propulsor 140. In a non-limiting example, intake duct 104 may include a duct outlet, wherein the duct outlet may connect primary duct channel 132 with propulsor 140. Clean airflow 124 separate from airflow 108 by inertial air separator 112 may flow through primary duct channel 132 and enter propulsor 140. The temperature of clean airflow 124 may be lower than the temperature inside propulsor 140, therefore clean airflow 124 may cool components within propulsor 140 such as, without limitation, electric motor, stator 144, rotor 148, and the like thereof. Clean air 124 may exit at the end of propulsor 140 where fan located.

With continued reference to FIG. 1, apparatus 100 may include a heat exchanger 152 configured to intake dirty airflow. As used in this disclosure, a "heat exchanger" is a system used to transfer heat between a source and a working fluid, such as, without limitation, dirty air 128. In some embodiments, without limitation, heat exchanger 152 may be placed on top of an invertor 156. In some embodiments, without limitation, heat exchanger 152 may surround the invertor 156. In other embodiments, without limitation, heat exchanger 152 may be disposed along with any other components of propulsor 140 except stator 144 and rotor 148 that requires cooling. In some embodiments, heat exchanger may include an inverter heatsink, wherein the inverter heatsink is a heat transfer medium. In some cases, inverter heatsink may include fans, fins, thermal resistance materials, and the like thereof. In some embodiments, the fins may be made using a material with high thermal conductivity. As a non-limiting example, the fins may include copper. In a non-limiting example, intake duct 104 may include a duct outlet, wherein the duct outlet may connect secondary duct channel 136 with a heat exchanger 152 placed on top of invertor 156, and wherein heat exchanger 152 may be an inverter heatsink. Dirty air 128 separated from airflow 108 by inertial air separator 112 may flow through secondary duct channel 136, exit through duct outlet, and contact with heat exchanger 152. The temperature of dirty airflow 128 may be lower than the temperature of heat exchanger 152, therefore dirty airflow 128 may cool heat exchanger 152 which further cools invertor 156. Dirty air 128 may exit at the end of propulsor 140 where fan located.

With continued reference to FIG. 1, in some embodiments, intake duct 104 may include an inlet valve 160. As used in this disclosure, an "inlet valve" is a component that controls fluidic communication between two or more components. In some cases, inlet valve 160 may allow airflow 108 to flow in only one direction, such as, without limitation, duct inlet to duct outlet. Exemplary non-limiting inlet valves include directional valves, control valves, selector valves, multi-port valves, check valves, and the like. Inlet valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. In a non-limiting example, intake duct 104 may include an inlet valve near duct inlet to prevent airflow 108 from entering intake duct 104. In some embodiments, inlet valve 160 may be disposed at duct inlet. In other embodiments, inlet valve 160 may be disposed at gradient 120. Additionally, or alternatively, intake duct 104 may include a plurality of inlet valves. In a non-limiting example, intake duct 104 may include an inlet valve at entrance of primary duct channel controlling communication between clean air 124 and propulsor 140, and another inlet valve at entrance of secondary duct channel controlling communication between dirty air 128 and heat exchanger 152. In some cases, extra moisture in dirty air 128 may help heat exchanger 152 for working more efficiently. Dirty air 128 may have increased humidity, which may increase its convective cooling ability. In a non-limiting example, extra moisture in dirty air 128 may prevent inverter heatsink of inverter 156 from clogging.

With continued reference to FIG. 1, inlet valve 160 may be actuated by any known method, such as without limitation by way of hydraulic, pneumatic, mechanical, or electrical energy. In some embodiments, inlet valve 160 may be actuated by an actuator. As used in this disclosure, an "actuator" is a component of the apparatus 100 that is responsible for moving and/or controlling a mechanism or system. The actuator or actuators may be communicatively connected to the computing device 164, wherein the computing device 164 may be configured to command the actuator or actuators to close or open inlet valve 160. In some embodiments, actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, in some embodiments, inlet valve 160 may be configured to accept airflow 108 as a function of a first cooling setting and reject airflow 108 as a function of a second cooling setting. As used in this disclosure, a "cooling setting" is a configuration for cooling components of electric aircraft, such as, without limitation, propulsor 140, stator 144, rotor 148, inverter 156, and the like thereof. In some embodiments, cooling setting may be received from computing device 164. Computing device 164 may be any computing device described in this disclosure. In some cases, first cooling setting may be cooling apparatus 100 and/or electric aircraft. In some cases, second cooling setting may be not cooling apparatus 100 and/or electric aircraft. In a non-limiting example, computing device 164 may include a first cooling setting of start cooling electric aircraft when the electric aircraft is powered on and/or cruising. Inlet valve may be open and accepting airflow 108 as a function of first cooling setting. In another non-limiting example, computing device 164 may include a second cooling setting of stop cooling electric aircraft when the electric aircraft is powered off and/or at stationary. Inlet valve may be closed and rejecting airflow 108 as a function of second cooling setting.

With continued reference to FIG. 1, in some embodiments, apparatus 100 may include a sensor 172 configured to measure an ambient temperature. As used in this disclosure, a "sensor" is a sensor is a device that produces an electrical output signal for purpose of sensing and monitoring events or changes in its environment. In some cases, plurality of sensors 168 may be communicatively connected to computing device 164 through wire connection. In other cases, plurality of sensors 168 may be communicatively connected to computing device 164 through a wireless connection. In one or more embodiments, and without limitation, sensor may include one or more temperature sensor, voltmeter, current sensor, hydrometer, infrared sensor, photoelectric sensor, ionization smoke sensor, motion sensor, pressure sensor, radiation sensor, level sensor, imaging device, moisture sensor, gas and chemical sensor, flame sensor, electrical sensor, imaging sensor, force sensor, Hall sensor, and the like. In some cases, sensor may be a contact or a non-contact sensor.

With continued reference to FIG. 1, in some embodiments, sensor 172 may include a temperature sensor. As used in this disclosure, a "temperature sensor" is a device that detects heat and converts it into an electrical signal. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. "Temperature," as used in this disclosure, and as would be appreciated by someone of ordinary skill in the art, is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 1, As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, as used in this disclosure, an "ambient temperature" is an air temperature of any object or environment where sensor 172 is stored. In some embodiments, without limitation, ambient temperature may be a temperature reading of the propulsor 140. In a non-limiting example, sensor 172 may be placed within propulsor 140 and configured to measure an ambient temperature of the propulsor 140 such as, without limitation, intake duct temperature, electric motor temperature, rotor temperature, inverter temperature, any temperature of components within propulsor 140, and the like thereof. In some embodiments, without limitation, ambient temperature may be a temperature reading of the environment. In a non-limiting example, sensor 172 may be placed proximal to the outer surface of apparatus 100 and/or electric aircraft and configured to measure an ambient temperature of external environment such as, without limitation, air temperature, and the like thereof. In some embodiments, sensor 172 may be placed in any location within apparatus 100 and/or electric aircraft, such as without limitation, fuselage, wings, nacelles, and the like thereof.

With continued reference to FIG. 1, in some embodiments, inlet valve 160 may be further configured to adjust intake duct 104 as a function of the ambient temperature. As used in this disclosure, "adjust" means to modify, change, or otherwise adjust the amount of airflow 108 allowed into intake duct 104. In some embodiments, adjusting intake duct 104 may include adjusting an opening degree of intake duct 104, wherein the opening degree may be an angle of intake duct 104 against the surface of electric aircraft or any component that may be in contact with airflow 108. In some embodiments, adjusting intake duct 104 may include actuating intake duct 104 using actuator described above in this disclosure. In some cases, increasing opening degree of intake duct 104 may result in accepting greater amount of airflow 108 into intake duct 104 through inlet valve 160. In other cases, decreasing opening degree of intake duct 104 may result in accepting lesser amount of airflow 108 into intake duct 104 through inlet valve 160. In a non-limiting example, intake duct 104 may be closed with an opening degree of zero or less. In another non-limiting example, intake duct 104 may be perpendicular to the surface of electric aircraft with an opening degree of 90 degrees. In some embodiments, inlet valve 160 may adjust intake duct 104 to a first opening degree at a first ambient temperature and adjust intake duct 104 to a second opening degree at a second ambient temperature. In a non-limiting example, intake duct 104 may be a variable NACA duct. Inlet valve 160 may increase opening degree of intake duct 104 for intake greater amount of airflow 108 into propulsor 140 when the propulsor temperature is high and may decrease opening degree of intake duct 104 for intake less amount of airflow 108 into propulsor 140 when the propulsor temperature is low. In some cases, adjusting intake duct may include adjusting drag force act on apparatus 100 and/or electric aircraft.

With continued reference to FIG. 1, in some embodiments, without limitation, inlet valve 160 may be configured to adjust opening degree of intake duct 104 as a function of a motor temperature. In some cases, motor temperature may include, without limitation, stator temperature, rotor temperature, temperature of any components within electric motor of propulsor 140, and the like. In a non-limiting example, sensor 172 may be configured to measure a motor temperature. Inlet valve 160 may increase opening degree of intake duct 104, specifically, opening degree of primary duct channel 132 for intake greater amount of clean airflow 124 within airflow 108 into propulsor 140 and further into electric motor, specifically, stator 144 and/or rotor 148 when the motor temperature measured by sensor 172 is high and may decrease opening degree of intake duct 104, specifically, opening degree of secondary duct channel 136 for intake less amount of airflow 108 into propulsor 140 and further into electric motor, specifically, stator 144 and/or rotor 148 when the motor temperature is low.

Figure 2:
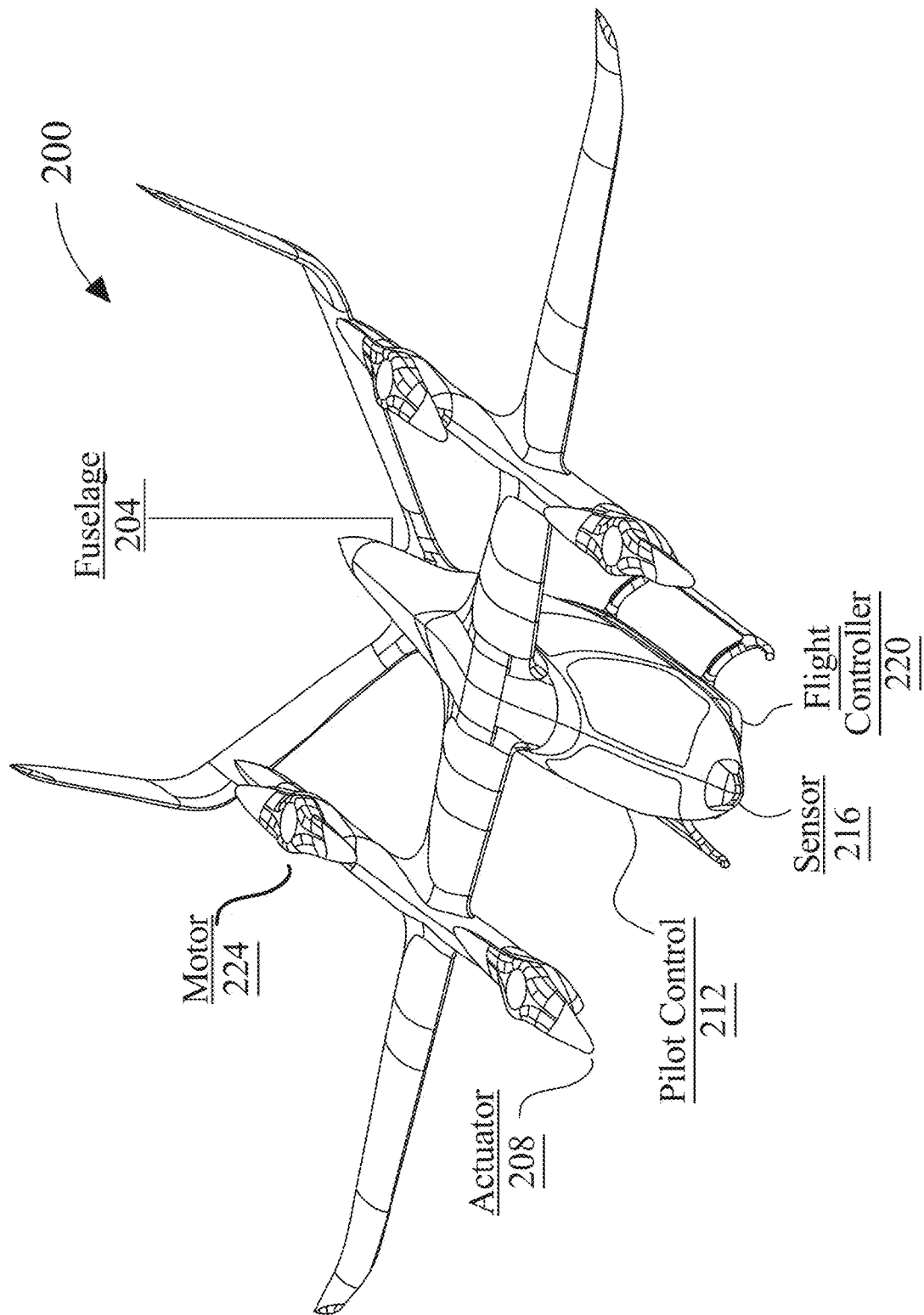
FIG. 2 is a diagram of an exemplary embodiment of an electric aircraft.

Referring now to FIG. 2, an exemplary embodiment of an aircraft 200 is illustrated. Aircraft 200 may include an electrically powered aircraft (i.e., electric aircraft). In some embodiments, electrically powered aircraft may be an electric vertical takeoff and landing (eVTOL) aircraft. In some embodiments, aircraft 200 may include a fuselage 204. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 2, aircraft 200 may include a plurality of actuators 208. Actuator 208 may include any motor and/or propulsor described in this disclosure. In an embodiment, actuator 208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 2, a plurality of actuators 208 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 208 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 208 may include a rudder, which may include, without limitation, a segmented rudder that produces a torque about a vertical axis. Additionally, or alternatively, plurality of actuators 208 may include other flight control surfaces such as propulsors, rotating flight controls, or any other structural features which can adjust movement of aircraft 200. Plurality of actuators 208 may include one or more rotors, turbines, ducted fans, paddle wheels, and/or other components configured to propel a vehicle through a fluid medium including, but not limited to air.

Still referring to FIG. 2, plurality of actuators 208 may include at least a propulsor component. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

Still referring to FIG. 2, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g., a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally, or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 2, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 2, plurality of actuators 208 may include power sources, control links to one or more elements, fuses, and/or mechanical couplings used to drive and/or control any other flight component. Plurality of actuators 208 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively, or additionally, a motor may be driven by an inverter. A motor may also include electronic speed controllers, inverters, or other components for regulating motor speed, rotation direction, and/or dynamic braking.

Still referring to FIG. 2, plurality of actuators 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 2, in another embodiment, an energy source may be used to provide a steady supply of electrical power to a load over a flight by an electric aircraft 200. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 2, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 2, another exemplary actuator may include landing gear. Landing gear may be used for take-off and/or landing/Landing gear may be used to contact ground while aircraft 200 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 2, aircraft 200 may include a pilot control 212, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 208. For example, and without limitation, collective control may alter and/or adjust the pitch angle of all of the main rotor blades collectively. For example, and without limitation pilot control 212 may include a yoke control. As used in this disclosure a "yoke control" is a mechanical control of an aircraft to control the pitch and/or roll. For example, and without limitation, yoke control may alter and/or adjust the roll angle of aircraft 200 as a function of controlling and/or maneuvering ailerons. In an embodiment, pilot control 212 may include one or more footbrakes, control sticks, pedals, throttle levels, and the like thereof. In another embodiment, and without limitation, pilot control 212 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 200 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 200 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 2, pilot control 212 may be configured to modify a variable pitch angle. For example, and without limitation, pilot control 212 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 212 may modify the variable pitch angle from a first angle of 2.71° to a second angle of 3.52°. Additionally or alternatively, pilot control 212 may be configured to translate a pilot desired torque for flight component 208. For example, and without limitation, pilot control 212 may translate that a pilot's desired torque for a propeller be 160 lb. ft. of torque. As a further non-limiting example, pilot control 212 may introduce a pilot's desired torque for a propulsor to be 290 lb. ft. of torque. Additional disclosure related to pilot control 212 may be found in U.S. patent application Ser. Nos. 17/001,545 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 2, aircraft 200 may include a loading system. A loading system may include a system configured to load an aircraft of either cargo or personnel. For instance, some exemplary loading systems may include a swing nose, which is configured to swing the nose of aircraft 200 of the way thereby allowing direct access to a cargo bay located behind the nose. A notable exemplary swing nose aircraft is Boeing 747. Additional disclosure related to loading systems can be found in U.S. patent application Ser. No. 17/107,594 entitled "SYSTEM AND METHOD FOR LOADING AND SECURING PAYLOAD IN AN AIRCRAFT" by R. Griffin et al., entirety of which in incorporated herein by reference.

Still referring to FIG. 2, aircraft 200 may include a sensor 216. Sensor 216 may include any sensor or noise monitoring circuit described in this disclosure. 216 may be configured to sense a characteristic of pilot control 212. Sensor may be a device, module, and/or subsystem, utilizing any hardware, software, and/or any combination thereof to sense a characteristic and/or changes thereof, in an instant environment, for instance without limitation a pilot control 212, which the sensor is proximal to or otherwise in a sensed communication with, and transmit information associated with the characteristic, for instance without limitation digitized data. Sensor 216 may be mechanically and/or communicatively coupled to aircraft 200, including, for instance, to at least a pilot control 212. Sensor 216 may be configured to sense a characteristic associated with at least a pilot control 212. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 216 may include at least a geospatial sensor. Sensor 216 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, sensor 216 may be configured to sense a characteristic associated with any pilot control described in this disclosure. Non-limiting examples of a sensor 216 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 216 may sense a characteristic as an analog measurement, for instance, yielding a continuously variable electrical potential indicative of the sensed characteristic. In these cases, sensor 216 may additionally comprise an analog to digital converter (ADC) as well as any additionally circuitry, such as without limitation a Whetstone bridge, an amplifier, a filter, and the like. For instance, in some cases, sensor 216 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, sensor 216 may sense a characteristic of a pilot control 212 digitally. For instance in some embodiments, sensor 216 may sense a characteristic through a digital means or digitize a sensed signal natively. In some cases, for example, sensor 216 may include a rotational encoder and be configured to sense a rotational position of a pilot control; in this case, the rotational encoder digitally may sense rotational "clicks" by any known method, such as without limitation magnetically, optically, and the like.

Still referring to FIG. 2, electric aircraft 200 may include at least a motor 224, which may be mounted on a structural feature of the aircraft. Design of motor 224 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 224 may include two main holes in top and bottom of mounting area to access bearing cartridge. Further, a structural feature may include a component of electric aircraft 200. For example, and without limitation structural feature may be any portion of a vehicle incorporating motor 224, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 208. Persons skilled in the art, upon reviewing the entirety of this disclosure, will be aware of various materials, combinations of materials, and/or constructions techniques.

Still referring to FIG. 2, a number of aerodynamic forces may act upon the electric aircraft 200 during flight. Forces acting on electric aircraft 200 during flight may include, without limitation, thrust, the forward force produced by the rotating element of the electric aircraft 200 and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the propulsor 208 of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor 224 may eliminate need for many external structural features that otherwise might be needed to join one component to another component. Motor 224 may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

Figure 3:
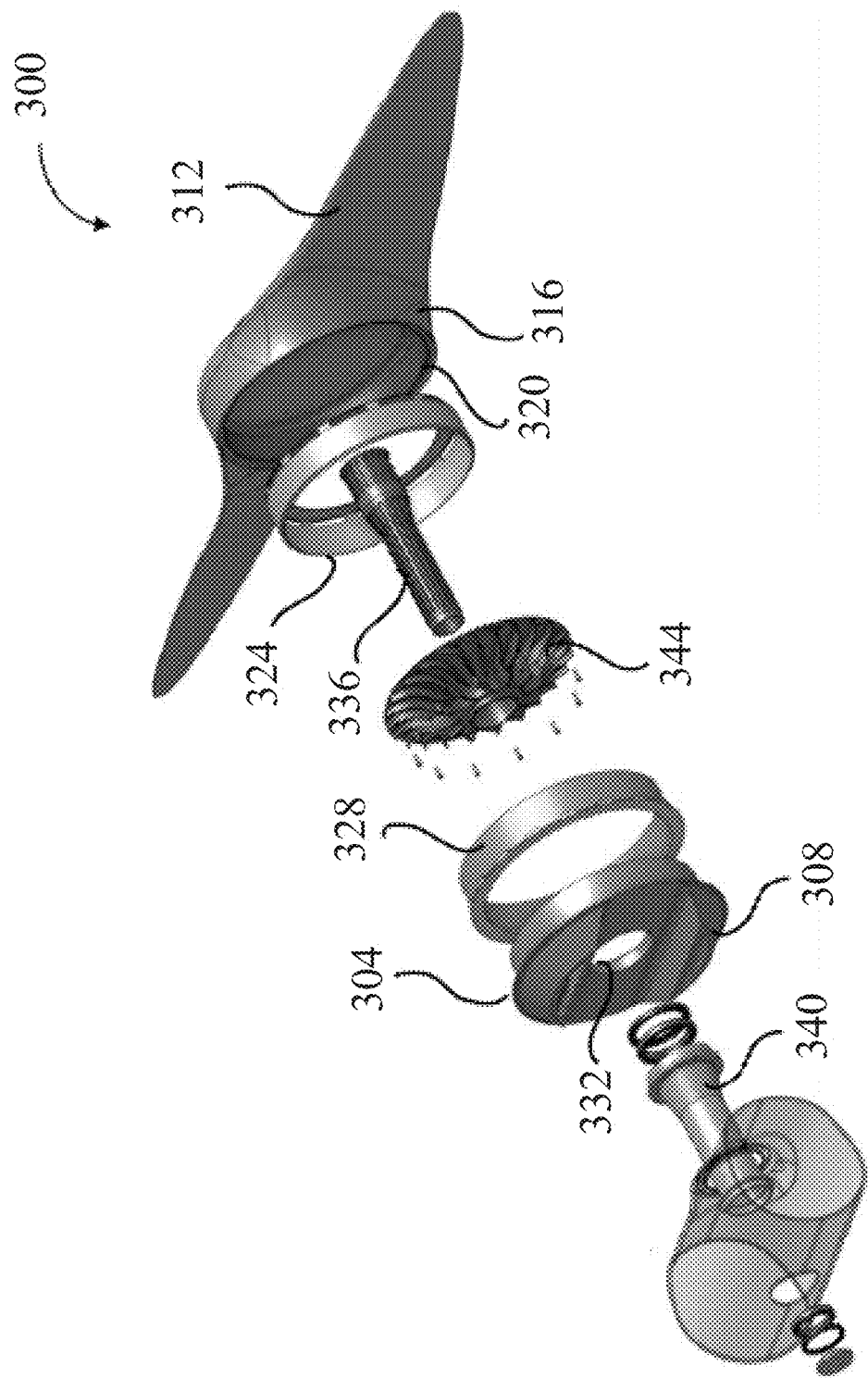
FIG. 3 is an illustration of an exploded view of an electric motor in a propulsion assembly.

Referring now to FIG. 3, an embodiment of electric motor 300 in the electric aircraft 200 is illustrated in an exploded view. Electric motor 300 may include at least a stator 304.

In an embodiment, stator 304 may include at least first magnetic element 308. As used herein, "first magnetic element" is an element that generates a magnetic field. For example, first magnetic element 308 may include one or more magnets which may be assembled in rows along a structural casing component. Further, first magnetic element 308 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an "electromagnet" is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 308 may act to produce or generate a magnetic field to cause other magnetic elements to rotate, as described in further detail below. Stator 304 may include a frame to house components including first magnetic element 308, as well as one or more other elements or components as described in further detail below. In an embodiment, a magnetic field may be generated by first magnetic element 308 and can include a variable magnetic field. In embodiments, a variable magnetic field may be achieved by use of an inverter, a controller, or the like.

Still referring to FIG. 3, Electric motor 300 may include propulsor 312. In embodiments, propulsor 312 may include an integrated rotor. Propulsor 312 may be any propulsor described in this disclosure. Propulsor 312 may be any device or component that consumes electrical power on demand to propel an aircraft or other vehicle while on ground and/or in flight. Propulsor 312 may include one or more propulsive devices. In an embodiment, propulsor 312 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 312 may include at least a blade. Persons skilled in the art, upon reviewing the entirety of this disclosure, will be aware of various devices that may be used as propulsor 312. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 312. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 3, in an embodiment, propulsor 312 may include hub 316 rotatably mounted to stator 304. "Rotatably mounted," as described herein, is functionally secured in a manner to allow rotation. Hub 316 is a structure which allows for the mechanically coupling of components of the integrated rotor assembly. In an embodiment, hub 316 can be mechanically coupled to propellers or blades. In an embodiment, hub 316 may be cylindrical in shape such that it may be mechanically joined to other components of the rotor assembly. Hub 316 may be constructed of any suitable material or combination of materials, including without limitation metal such as aluminum, titanium, steel, or the like, polymer materials or composites, fiberglass, carbon fiber, wood, or any other suitable material. Hub 316 may move in a rotational manner driven by interaction between stator and components in the rotor assembly. Persons skilled in the art, upon reviewing the entirety of this disclosure, will be aware of various structures that may be used as or included as hub 316, as used and described herein.

Still referring to FIG. 3, in an embodiment, propulsor 312 and/or rotor shaft 336 may include second magnetic element 320, which may include one or more further magnetic elements. Second magnetic element 320 generates a magnetic field designed to interact with first magnetic element 308. Second magnetic element 320 may be designed with a material such that the magnetic poles of at least a second magnetic element are oriented in an opposite direction from first magnetic element 308. In an embodiment, second magnetic element 320 may be affixed to hub 316, rotor shaft 336, or another rotating or stationary electric motor component disclosed herein. Affixed, as described herein, is the attachment, fastening, connection, and the like, of one component to another component. For example, and without limitation, affixed may include bonding the second magnetic element 320 to hub 316, such as through hardware assembly, spot welding, riveting, brazing, soldering, glue, and the like. Second magnetic element 320 may include any magnetic element suitable for use as first magnetic element 308. For instance, and without limitation, second magnetic element may include a permanent magnet and/or an electromagnet. Second magnetic element 320 may include magnetic poles oriented in a second direction opposite, in whole or in part, of the orientation of the poles of first magnetic element 308. In an embodiment, Electric motor 300 may include a motor assembly incorporating stator 304 with a first magnet element and second magnetic element 320. First magnetic element 308 may include magnetic poles oriented in a first direction, a second magnetic element includes a plurality of magnetic poles oriented in the opposite direction than the plurality of magnetic poles in the first magnetic element 308.

Referring again to FIG. 3, in an embodiment, first magnetic element 308 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 308.

In an embodiment, first magnetic element 308 may produce a magnetic field according to magnetic poles of first magnetic element 308 oriented in a first direction. Second magnetic element 320 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 316 and rotor assembly may both be cylindrical in shape where rotor may have a slightly smaller circumference than hub 316 to allow the joining of both structures. Coupling of hub 316 to stator 304 may be accomplished via a surface modification of either hub 316, stator 304 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 312 into hub 316, may reduce a profile of Electric motor 300 resulting in a reduced profile drag. In an embodiment, the rotor, which may include motor inner magnet carrier 324, motor outer magnet carrier 328, propulsor 312 may be incorporated into hub 316. In an embodiment, inner motor magnet carrier 324 may rotate in response to a magnetic field. The rotation may cause hub 316 to rotate. This unit may be inserted into Electric motor 300 as one unit. This may enable ease of installation, maintenance, and removal.

Still referring to FIG. 3, stator 304 may include through-hole 332. Through-hole 332 may provide an opening for a component to be inserted through to aid in attaching propulsor with integrated rotor and rotor shaft to stator. In an embodiment, through-hole 332 may have a round or cylindrical shape and be located at a rotational axis of stator 304, which in an embodiment may be similar to or the same as axis of rotation 312. Hub 316 may be mounted to stator 304 by means of rotor shaft 336 rotatably inserted though through-hole 332. The rotor shaft 336 may be mechanically coupled to stator 304 such that rotor shaft 336 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 332 may have a diameter that is slightly larger than a diameter of rotor shaft 336 to allow rotor shaft 336 to fit through through-hole 332 to connect stator 304 to hub 316. Rotor shaft 336 may rotate in response to rotation of propulsor 312.

Still referring to FIG. 3, Electric motor 300 may include a bearing cartridge 340. Bearing cartridge 340 may include a bore. Rotor shaft 336 may be inserted through the bore of bearing cartridge 340. Bearing cartridge 340 may be attached to a structural element of a vehicle. Bearing cartridge 340 functions to support the rotor and to transfer the loads from the motor. Loads may include, without limitation, weight, power, magnetic pull, pitch errors, out of balance situations, and the like. Bearing cartridge 340 may include a bore. Bearing cartridge 340 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 340 may be subject to a load which may include, without limitation, a radial or a thrust load. Depending on the location of bearing cartridge 340 in the assembly, it may see all of a radial or thrust load or a combination of both. In an embodiment, bearing cartridge 340 may join Electric motor 300 to a structure feature. Bearing cartridge 340 may function to minimize the structural impact from the transfer of bearing loads during flight and/or to increase energy efficiency and power of propulsor. Bearing cartridge 340 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 340 may act to keep propulsor 312 and components intact during flight by allowing Electric motor 300 to rotate freely while resisting loads such as an axial force. In an embodiment, bearing cartridge 340 may include a roller bearing incorporated into the bore. a roller bearing is in contact with rotor shaft 336. Stator 304 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 336 into bearing cartridge 340.

Still referring to FIG. 3, Electric motor 300 may include a motor assembly incorporating a rotating assembly and a stationary assembly. Hub 316, motor inner magnet carrier 324 and rotor shaft 336 may be incorporated into the rotor assembly of Electric motor 300 which make up rotating parts of electric motor, moving between the stator poles and transmitting the motor power. As one integrated part, the rotor assembly may be inserted and removed in one piece. Stator 304 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 308 in Electric motor 300 may include an active magnet. For instance, and without limitation, a second magnetic element may include a passive magnet, a magnet that reacts to a magnetic force generated by first magnetic element 308. In an embodiment, a first magnet positioned around the rotor assembly, may generate magnetic fields to affect the position of the rotor relative to the stator 304. A controller may have an ability to adjust electricity originating from a power supply and, thereby, the magnetic forces generated, to ensure stable rotation of the rotor, independent of the forces induced by the machinery process.

Electric motor 300 may include impeller 344 coupled with the rotor shaft 336. An impeller, as described herein, is a rotor used to increase or decrease the pressure and flow of a fluid, including at least air. Impeller 344 may function to provide cooling to Electric motor 300. Impeller 344 may include varying blade configurations, such as radial blades, non-radial blades, semi-circular blades and airfoil blades. Impeller 344 may further include single and/or double-sided configurations. Impeller 344 is described in further detail below. Additionally, or alternatively, in a non-limiting illustrative example, rotor shaft 336 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively, or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 4:
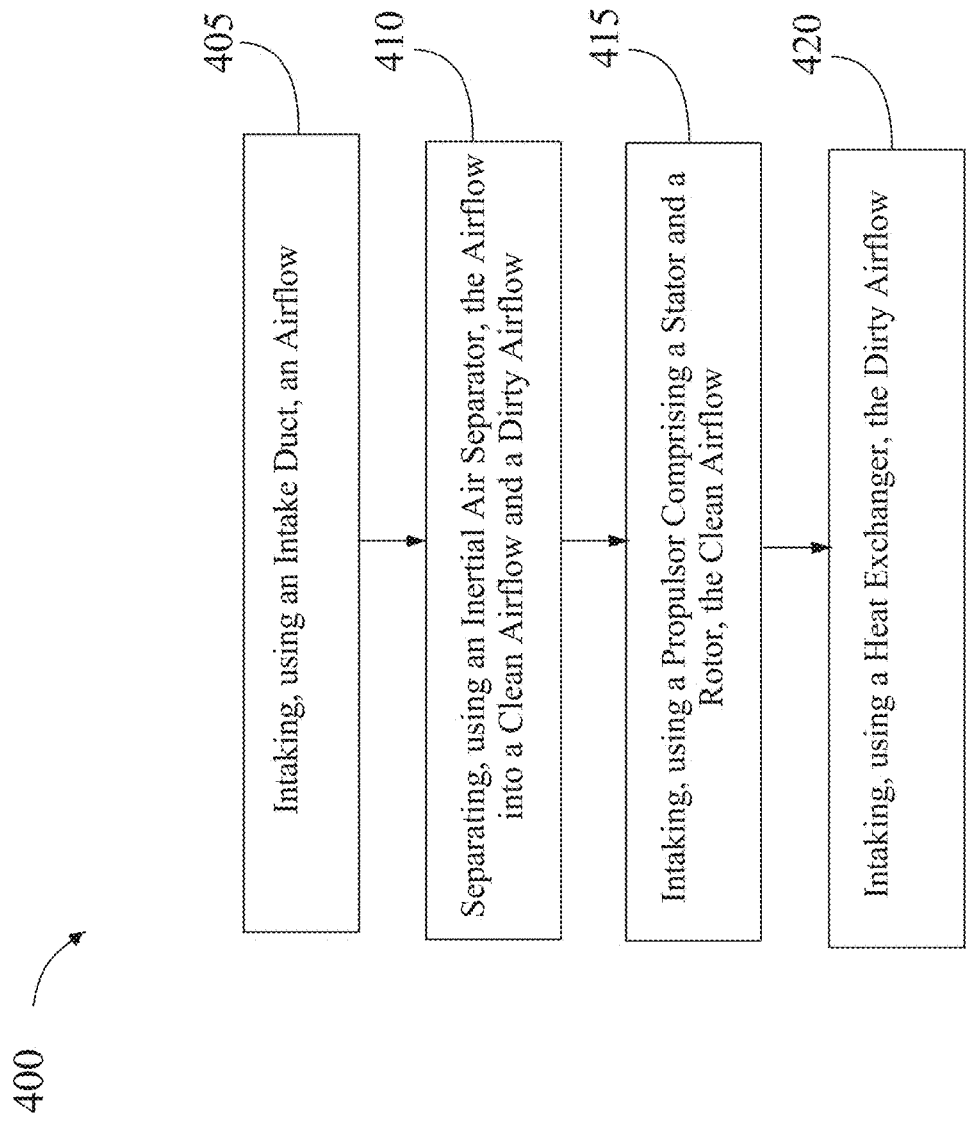
FIG. 4 is flow diagram of an exemplary method for an inertial separation of air in an electric aircraft.

Referring now to FIG. 4, an exemplary method 400 for an inertial separation of air in an electric aircraft is illustrated. In some embodiments, electric aircraft, may include an electric vertical takeoff and landing (eVTOL) aircraft. This may be implemented, without limitation, as described above in reference to FIGS. 1-3.

With continued reference to FIG. 4, method 400 includes a step 405 of intaking, using an intake duct, an airflow, without limitation, as described above in reference to FIGS. 1-3. Intake duct may include any intake duct described in this disclosure. In some embodiments, intake duct may include a NACA duct. Airflow may be any airflow described in this disclosure. In some embodiments, intake duct may include an inlet valve. In some embodiments, inlet valve may be configured to accept the airflow as a function of a first cooling setting and reject the airflow as a function of a second cooling setting. This may be implemented, without limitation, as described above in reference to FIGS. 1-3. In other embodiments, apparatus may further include a sensor configured to measure an ambient temperature. Inlet valve may be configured to adjust intake duct as a function of ambient temperature. This may be implemented, without limitation, as described above in reference to FIGS. 1-3.

With continued reference to FIG. 4, method 400 includes a step 410 of separating, using an inertial air separator, the airflow into a clean airflow and a dirty airflow, without limitation, as described above in reference to FIGS. 1-3. In some embodiments, inertial air separator may include a gradient configured to disengage a plurality of physical particles from the airflow. This may be implemented, without limitation, as described above in reference to FIGS. 1-3.

With continued reference to FIG. 4, method 400 includes a step 415 of intaking, using a propulsor comprising a stator and a rotor, the clean airflow, without limitation, as described above in reference to FIGS. 1-3. In some embodiments, clean airflow may be used to cool the stator and the rotor within the propulsor. This may be implemented, without limitation, as described above in reference to FIGS. 1-3.

With continued reference to FIG. 4, method 400 includes a step 420 of intaking, using a heat exchanger, the dirty airflow, without limitation, as described above in reference to FIGS. 1-3. In some embodiments, dirty airflow may be used to cool an inverter. This may be implemented, without limitation, as described above in reference to FIGS. 1-3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
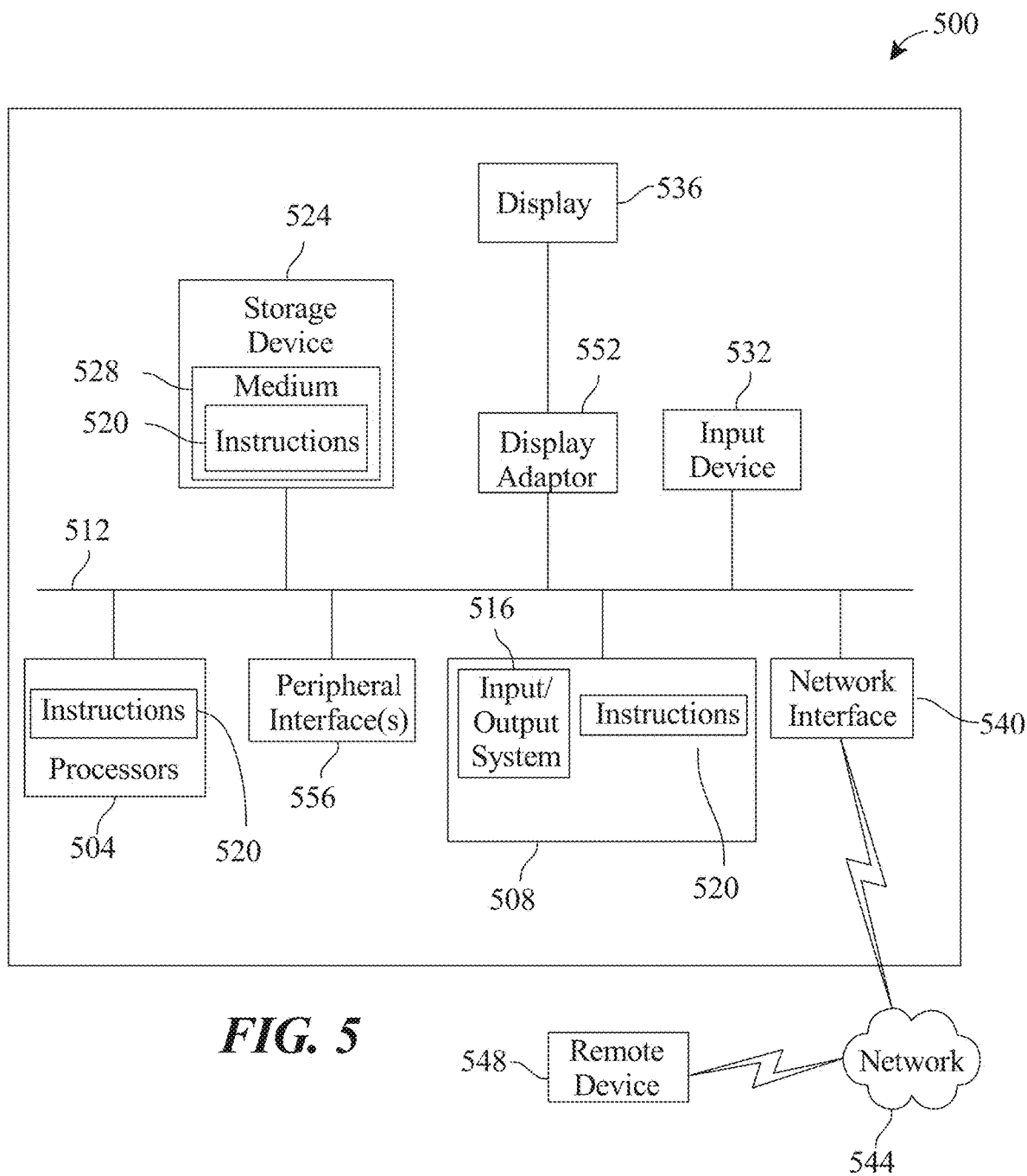
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system, such as the integrated electric propulsion assembly 500 system of FIG. 5, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 594 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric propulsion system for an electric, aircraft, wherein the electric propulsion system comprises:
   an intake duct configured to intake an airflow;
   an inertial air separator configured to separate the airflow into a clean airflow and a dirty, airflow;
   a secondary duct channel located downstream of inertial air separator for receiving the dirty airflow;
   a primary duct channel located downstream of the inertial air separator and radial inward of the secondary duct channel for receiving the clean airflow; and
   a propulsor that includes:
      a propeller;
      an electric motor configured to drive the propeller, the electric motor comprising:
         a stator; and
         a rotor;
      an inverter configured to power the electric motor, wherein the inverter is disposed between the propeller and the electric motor; and
      a heat exchanger coupled to the inverter,
   wherein the primary duct channel directs the clean airflow across the stator for cooling the electric motor, and the secondary duct channel directs the dirty airflow to bypass the electric motor and directs the dirty airflow across the heat exchanger for cooling the inverter.

2. The electric propulsion system of claim 1, wherein the inertial air separator comprises a gradient configured to disengage a plurality of physical particles from the airflow.

3. The electric propulsion system of claim 2, wherein the clean airflow is directed over the rotor within the propulsor.

4. The electric propulsion system of claim 2, wherein the heat exchanger comprises an inverter heatsink.

5. The electric propulsion system of claim 1, wherein the intake duct comprises an inlet valve.

6. The electric propulsion system of claim 5, wherein the inlet valve is configured to:
   accept the airflow as a function of a first cooling setting; and
   reject the airflow as a function of a second cooling setting.

7. The electric propulsion system of claim 5, wherein the electric propulsion system comprises a sensor configured to measure an ambient temperature, wherein the inlet valve is configured to adjust the intake duct as a function of the ambient temperature.

8. The electric propulsion system of claim 5, wherein the electric propulsion system comprises a sensor configured to measure an electric motor temperature of the electric motor.

9. The electric propulsion system of claim 8, wherein the inlet valve is configured to adjust opening degree of the intake duct as a function of the electric motor temperature.

10. The electric propulsion system of claim 1, wherein a first gradient of the primary duct channel corresponds to a second gradient of the secondary duct channel.

11. The electric propulsion system of claim 1, wherein the primary duct channel comprises a first gradient and the secondary duct channel comprise a second gradient.

12. The electric, propulsion system of claim 1, wherein the inertial air separator comprises an annular inertial air separator configured to surround a core.

13. The electric propulsion system of claim 12, wherein the core is disposed in the center of the intake duct.

14. A method for an inertial separation of air in an electric aircraft, wherein the method comprises:
   intaking, using an intake duct, an airflow;
   separating, using an inertial air separator, the airflow into a clean airflow and a dirty airflow;
   directing, by a primary duct channel located downstream of the inertial air separator and radially inward of secondary duct channel, the clean airflow across a stator for cooling an electric motor;
   directing, by the secondary duct channel, the dirty airflow to bypass the electric motor; and
   directing, by the secondary duct channel, the dirty airflow across a heat exchanger for cooling an inverter.

15. The method of claim 14, wherein the inertial air separator comprises a gradient configured to disengage a plurality of physical particles from the airflow.

16. The method of claim 15, wherein the clean airflow is directed over the stator and a rotor within the electric motor.

17. The method of claim 15, wherein the heat exchanger comprises an inverter heatsink.

18. The method of claim 14, wherein the intake duct comprises an inlet valve.

19. The method of claim 18, further comprising:
   accepting, using the inlet valve, the airflow as a function of a first cooling setting; and
   rejecting, using the inlet valve, the airflow as a function of a second cooling setting.

20. The method of claim 18, further comprising:
   measuring, using a sensor, an ambient temperature; and
   adjusting, using the inlet valve, the intake duct as a function of the ambient temperature.

* * * * *

UNITED STATES PATENT AND TRADEMARK OFFICE
CERTIFICATE OF CORRECTION

PATENT NO. : 11,964,223 B1
APPLICATION NO. : 17/966809
DATED : April 23, 2024
INVENTOR(S) : Brecher et al.

Page 1 of 1

It is certified that error appears in the above-identified patent and that said Letters Patent is hereby corrected as shown below:

In the Claims

In Column 27, Line 17, Claim 1, before "inertial", insert -- the --.

In Column 27, Line 20, Claim 1, delete "radial" and insert -- radially --, therefor.

Signed and Sealed this
Twenty-third Day of July, 2024

Katherine Kelly Vidal
*Director of the United States Patent and Trademark Office*